(12) United States Patent
Yanagawa et al.

(10) Patent No.: US 9,278,870 B2
(45) Date of Patent: Mar. 8, 2016

(54) ULTRAVIOLET IRRADIATION APPARATUS AND ULTRAVIOLET IRRADIATION METHOD

(71) Applicant: Panasonic Corporation, Osaka (JP)

(72) Inventors: Hiroto Yanagawa, Osaka (JP); Yoshinobu Aoyagi, Shiga (JP); Noriko Kurose, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/594,383

(22) Filed: Jan. 12, 2015

(65) Prior Publication Data

US 2015/0203369 A1    Jul. 23, 2015

Related U.S. Application Data

(60) Provisional application No. 61/929,660, filed on Jan. 21, 2014.

(51) Int. Cl.
*A61L 2/10* (2006.01)
*C02F 1/32* (2006.01)

(52) U.S. Cl.
CPC ........... *C02F 1/325* (2013.01); *C02F 2201/326* (2013.01); *C02F 2201/3228* (2013.01); *C02F 2209/001* (2013.01); *C02F 2209/003* (2013.01); *C02F 2301/022* (2013.01); *C02F 2301/028* (2013.01)

(58) Field of Classification Search
USPC ............. 250/436, 432 R, 433, 434, 435, 437, 250/438, 453.11, 454.11, 455.11; 422/22, 422/24
See application file for complete search history.

(56) References Cited

U.S. PATENT DOCUMENTS

| | | | |
|---|---|---|---|
| 2006/0131246 A1* | 6/2006 | Ehlers | C02F 1/325 210/748.1 |
| 2007/0154823 A1* | 7/2007 | Marson et al. | 430/30 |
| 2008/0116054 A1* | 5/2008 | Leach et al. | 204/157.3 |
| 2010/0289435 A1 | 11/2010 | Kita | |
| 2012/0001091 A1 | 1/2012 | Zhou et al. | |
| 2012/0161104 A1 | 6/2012 | Okamoto et al. | |

FOREIGN PATENT DOCUMENTS

| | | |
|---|---|---|
| JP | 4-286855 | 10/1992 |
| JP | 6-052803 | 2/1994 |
| JP | 2011-055898 | 3/2011 |
| JP | 2011-124000 | 6/2011 |
| JP | 2012-519126 | 8/2012 |
| WO | 2009/031584 | 3/2009 |
| WO | 2011/024615 | 3/2011 |

OTHER PUBLICATIONS

Aoyagi, et al., "A 2-inch, large-size deep ultraviolet light-emitting device using dynamically controlled micro-plasma excited AlGaN" Applied Physics Letters 102, 041114 (2013).

* cited by examiner

*Primary Examiner* — Nicole Ippolito
(74) *Attorney, Agent, or Firm* — Renner, Otto, Boisselle & Sklar, LLP

(57) ABSTRACT

An ultraviolet irradiation apparatus includes a fluid holder including a bottom portion having an upper surface and a lower surface, the bottom portion holding a fluid on the upper surface with a substantially uniform thickness; and a light-emitting device that substantially uniformly irradiates the fluid held on the upper surface with ultraviolet light.

21 Claims, 13 Drawing Sheets

ULTRAVIOLET IRRADIATION APPARATUS AND ULTRAVIOLET IRRADIATION METHOD

CROSS REFERENCES TO RELATED APPLICATIONS

This application claims priority to U.S. Provisional Patent Application No. 61/929,660, filed on Jan. 21, 2014, the contents of which are hereby incorporated by reference.

BACKGROUND

1. Technical Field

The present application relates to an ultraviolet irradiation apparatus that irradiates a fluid with ultraviolet light and ultraviolet irradiation method.

2. Description of the Related Art

To date, ultraviolet irradiation apparatuses for irradiating water with ultraviolet light have been used to sterilize water. For example, Japanese Unexamined Patent Application Publication No. 2011-55898 describes one of such apparatuses.

To date, apparatuses utilizing a low-pressure mercury lamp have been used to sterilize water. Typically, low-pressure mercury lamps emit ultraviolet light having wavelengths of 185 nm and 254 nm. Ultraviolet light in this wavelength range is usually called deep ultraviolet light (DUV). It is known that, among wavelengths of light emitted from a low-pressure mercury lamp, deep ultraviolet light having a wavelength of 254 nm has particularly high sterilization capability. Basically, a light source of a mercury lamp is a point light source or a linear light source, and deep ultraviolet light is emitted radially from the light source.

Japanese Unexamined Patent Application Publication No. 2011-55898 describes a technology in which a surface light source is used to emit deep ultraviolet light. In the technology described in Japanese Unexamined Patent Application Publication No. 2011-55898, a surface light source is obtained by irradiating a metallic fluoride with an electron beam. This document also describes a method of sterilizing water by using a surface light source having a surface on which a plurality of winding water channels are formed.

SUMMARY

One non-restricting and exemplary embodiment provides an ultraviolet irradiation apparatus that uniformly irradiates a fluid with ultraviolet light.

According to one aspect of the present disclosure, an ultraviolet irradiation apparatus includes a fluid holder including a bottom portion having an upper surface and a lower surface, the bottom portion holding a fluid on the upper surface with a substantially uniform thickness; and a light-emitting device that substantially uniformly irradiates the fluid held on the upper surface with ultraviolet light.

With the ultraviolet irradiation apparatus according to one aspect of the present disclosure, because a fluid having a uniform thickness is irradiated with ultraviolet light, it is possible to uniformly irradiate the fluid with ultraviolet light. Thus, for example, it is possible to efficiently sterilize water by using the ultraviolet irradiation apparatus as a water sterilization apparatus.

These general and specific aspects may be implemented using a method. Additional benefits and advantages of the disclosed embodiments will be apparent from the specification and Figures. The benefits and/or advantages may be individually provided by the various embodiments and features of the specification and drawings disclosure, and need not all be provided in order to obtain one or greater of the same.

DETAILED DESCRIPTION OF THE EMBODIMENTS

Figure 1:
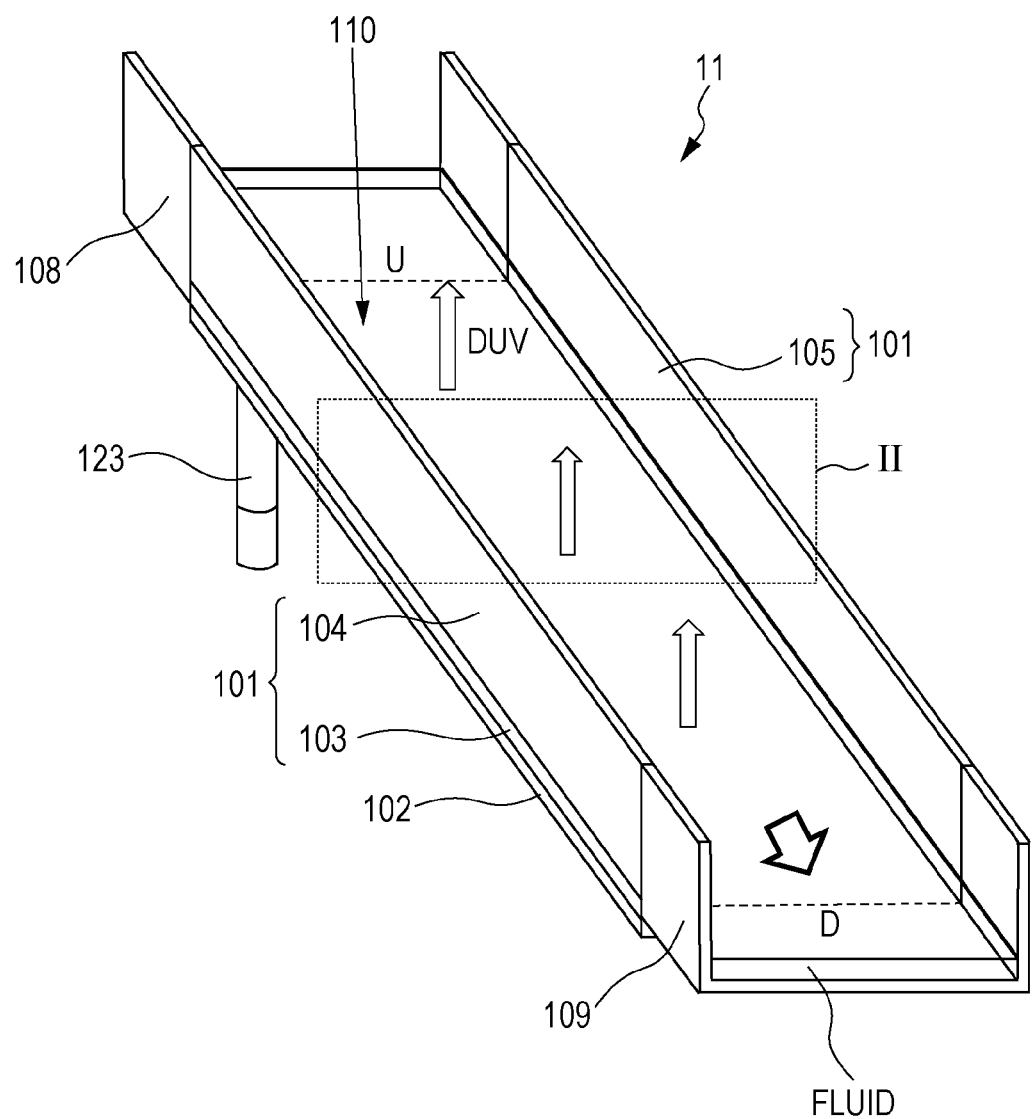
FIG. 1 is an external view of an ultraviolet irradiation apparatus according to a first exemplary embodiment.

The present inventors have discovered that in conventional apparatuses that irradiate water with deep ultraviolet light by using a mercury lamp, water flows in a turbulent flow, and thus, it is difficult to uniformly irradiate water with deep ultraviolet light.

An ultraviolet irradiation apparatus according to an aspect of the present disclosure includes a fluid holder including a bottom portion having an upper surface and a lower surface, the bottom portion holding a fluid on the upper surface with a substantially uniform thickness; and a light-emitting device that substantially uniformly irradiates the fluid held on the upper surface with ultraviolet light.

In an embodiment, the fluid is a liquid.

In an embodiment, the liquid is water.

In an embodiment, the upper surface is a flat surface.

In an embodiment, the upper surface is an inclined surface and the fluid held on the upper surface flows steadily along the inclined surface.

In an embodiment, the fluid held on the upper surface flows in a laminar flow.

In an embodiment, the ultraviolet light has a peak wavelength that is 180 nm or greater and 350 nm or less.

In an embodiment, the bottom portion is made of a material that transmits the ultraviolet light, and the light-emitting device substantially uniformly irradiates the fluid held on the upper surface with the ultraviolet light from the lower surface through the bottom portion.

In an embodiment, the ultraviolet light is emitted substantially perpendicularly to the upper surface.

In an embodiment, the bottom portion of the fluid holder is made of a silica glass.

In an embodiment, in the fluid holder, a part of the liquid is in contact with a gas.

In an embodiment, the gas is nitrogen.

In an embodiment, the ultraviolet irradiation apparatus further includes a reflector plate that faces the upper surface, the reflector plate reflecting at least a part of the ultraviolet light that has passed through the fluid held on the upper surface toward the fluid.

In an embodiment, the ultraviolet irradiation apparatus further includes a sensor that faces the upper surface, the sensor detecting an amount of at least a part of the ultraviolet light that has passed through the fluid held on the upper surface.

In an embodiment, the ultraviolet irradiation apparatus further includes a controller that controls an amount per unit time of the ultraviolet light to irradiate the fluid in accordance with an amount of the ultraviolet light detected by the sensor.

In an embodiment, the ultraviolet irradiation apparatus further includes a controller that controls a time for which the fluid is irradiated with the ultraviolet light in accordance with an amount of the ultraviolet light detected by the sensor.

In an embodiment, the light-emitting device faces the upper surface, and the light-emitting device substantially uniformly irradiates the fluid held on the upper surface with the ultraviolet light.

In an embodiment, the ultraviolet light is micro-plasma excitation light.

In an embodiment, the upper surface is substantially horizontal, the fluid holder stores the fluid for a certain time, and, in the certain time, the light-emitting device irradiates the fluid with the ultraviolet light for a predetermined time.

In an embodiment, the ultraviolet irradiation apparatus sterilizes the water by irradiating the water with the ultraviolet light.

In an embodiment, the light-emitting device irradiates different parts of the fluid held on the upper surface with ultraviolet light having different wavelengths in accordance with positions of the parts of the fluid.

In an embodiment, the fluid holder has a representative length L which satisfies $VL/v \leq CRE$, where CRE denotes a critical Reynolds number, $v$ denotes a coefficient of kinematic viscosity of the fluid, and V denotes a flow velocity of the fluid.

An ultraviolet irradiation method according to an aspect of the present disclosure includes a step of substantially uniformly irradiating a fluid with ultraviolet light while holding the fluid with a substantially uniform thickness.

Hereinafter, embodiments of the present disclosure will be described with reference to the drawings.

First Embodiment

First, referring to FIG. 1, the structure of an ultraviolet irradiation apparatus according to a first embodiment will be described. The ultraviolet irradiation apparatus according to the first embodiment functions as a water sterilizing apparatus. In the present specification, the first embodiment will be described by using an ultraviolet irradiation apparatus for sterilizing water as an example.

FIG. 1 is an external view of an ultraviolet irradiation apparatus 11 according to a first exemplary embodiment. As illustrated in FIG. 1, the ultraviolet irradiation apparatus 11 according to the first embodiment includes a fluid holder 101 that holds a fluid, a light-emitting device 102 that emits ultraviolet light, a water inlet 108, and a water outlet 109.

The fluid holder 101 includes a bottom portion 103 and side walls 104 and 105. A channel 110, through which a fluid flows, is formed by the bottom portion 103 and the two side walls 104 and 105. The channel 110 extends straightly in a direction in which the fluid flows. The side walls 104 and 105 stop the fluid from dropping from the bottom portion 103. The side walls 104 and 105, which generate resistance to the flow of the fluid, may be separated from each other as far as possible. For example, the distance between the side walls 104 and 105 may be larger than the length of the channel 110 in the direction in which the fluid flows (the distance from a position U to a position D in FIG. 1).

Figure 2:
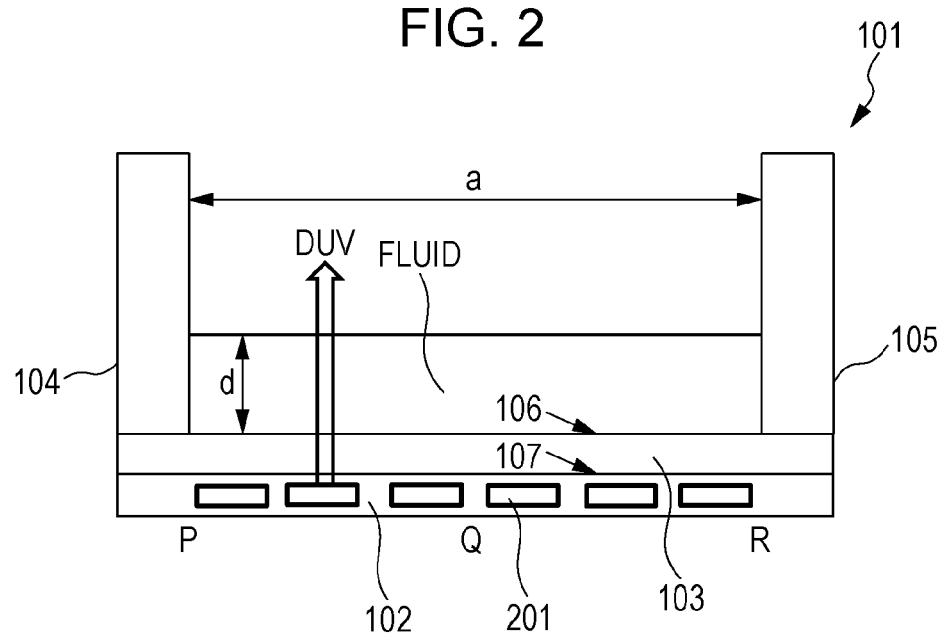
FIG. 2 is a sectional view of a fluid holder taken along a plane II in FIG. 1.

FIG. 2 is a sectional view of the fluid holder 101 taken along a plane II in FIG. 1. The plane II cuts the fluid holder 101 perpendicularly to the bottom portion 103. The bottom portion 103 has an upper surface 106 that holds the fluid and a lower surface 107 toward which the light-emitting device 102 emits ultraviolet light. The side walls 104 and 105 are perpendicular to the upper surface 106. The upper surface 106 and surfaces of the side walls 104 and 105 that contact the fluid are flat surfaces. Thus, the channel 110, which has a rectangular sectional shape, is formed by the bottom portion 103 and the side walls 104 and 105.

As illustrated in FIG. 2, the thickness d of water in the channel 110 above the upper surface 106 is substantially uniform from a position (P) near the side wall 104 to a position (R) near the side wall 105, irrespective of the position of the water in the width direction of the upper surface 106. It is desirable that the thickness d of water in the channel 110 above the upper surface 106 is substantially uniform in the direction in which the water flows, as well. Thus, in the fluid holder 101, the fluid is held on the upper surface 106 with a substantially uniform thickness. The phrase "the fluid is held with a substantially uniform thickness" means that, when dmax (m) and dmin (m) respectively denote the maximum value and minimum value of the thickness of water along the width direction of the channel 110 (the PR direction in FIG. 2), the fluid is held on the upper surface 106 so that dmin/dmax is 0.8 or greater and 1.0 or less.

As illustrated in FIG. 2, the upper surface of the fluid is not in contact with the channel 110 and a part of the fluid is in contact with a gas. Thus, it is considered that resistance to the fluid due to the channel 110 can be reduced. As will be described below, the channel 110 may be hermetically sealed by disposing a reflector plate on the fluid holder 101 and the channel 110 may be filled with nitrogen. In this case, a part of the fluid is in contact with nitrogen.

The bottom portion 103 is made of a material that transmits ultraviolet light. Examples of the material include silica, silica glass, fluoride glass, and calcium fluoride. For example, if the material is silica, the thickness of the bottom portion 103 may be 1 mm or greater and 3 mm or less. In this case, the bottom portion 103 can have a transmittance of about 70% or greater. However, as long as the bottom portion 103 can have a high transmittance of ultraviolet light, such as a transmittance of 90% or greater, the thickness of the bottom portion 103 may be appropriately changed according to design specifications or the like.

Figure 3:
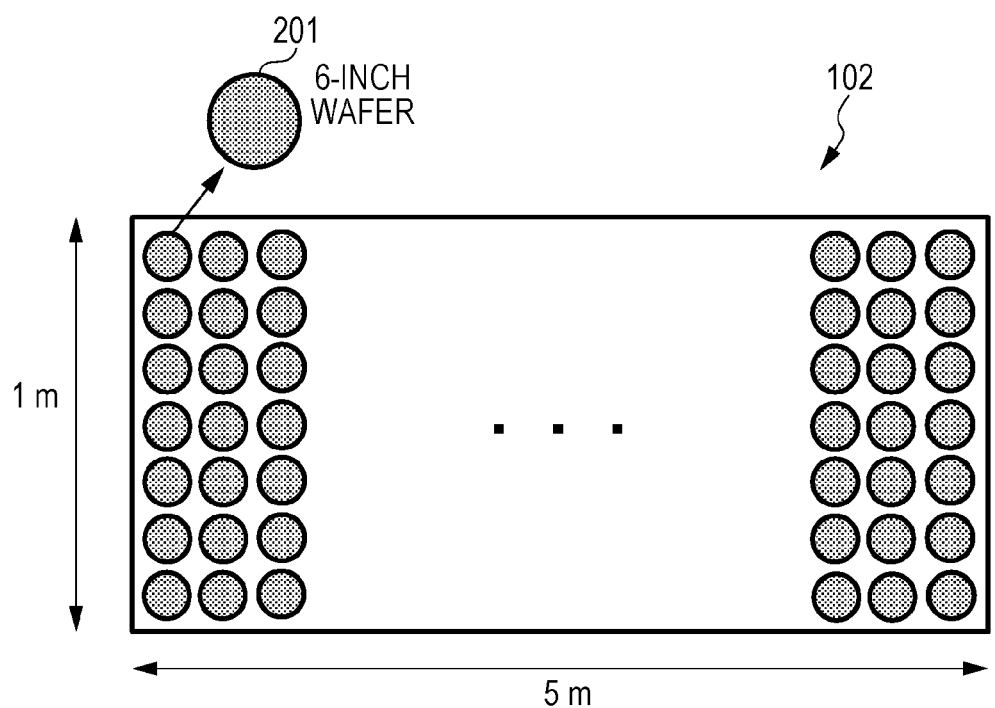
FIG. 3 illustrates a typical structure of a light-emitting device.

Referring to FIG. 3, the structure of the light-emitting device 102 will be described. FIG. 3 illustrates a typical structure of the light-emitting device 102. The light-emitting device 102 includes a plurality of light-emitting elements 201 that emit deep ultraviolet light. For example, the light-emitting elements 201 may be formed on 6-inch wafers. As illustrated in FIG. 3, in the light-emitting device 102, a plurality of wafers are arranged on a flat surface in a matric pattern. For example, this structure can be obtained by arranging the light-emitting elements 201 in a panel-like pattern by using a sealing technology for a plasma display panel (PDP). For example, when 6-inch wafers are used, the size of the light-emitting device 102 is about 1 m×5 m. Thus, the light-emitting device 102 is a large-area light source that uniformly emits ultraviolet light.

Figure 4:
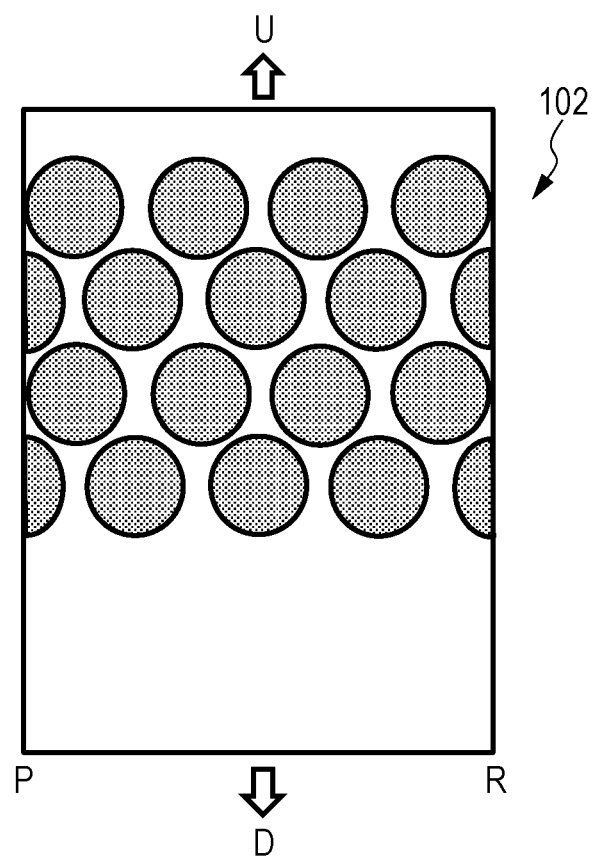
FIG. 4 illustrates another exemplary structure of the light-emitting device.

FIG. 4 illustrates another example of the structure of the light-emitting device 102. As illustrated in FIG. 4, a plurality of wafers may arranged on a flat surface in a so-called honeycomb pattern, in which the centers of the wafers on every other lines are aligned with each other in the direction of flow of the fluid. In this case, the light-emitting device 102 can more uniformly irradiate the fluid with ultraviolet light irrespective of the positions of the flow of the fluid in the width direction of the channel 110.

For example, the light-emitting element 201 is a surface-emission light-emitting element that uniformly emits deep ultraviolet light in the direction perpendicular to a front surface thereof having a wafer shape. Thus, a surface-emission large-area light source is realized and the fluid can be uniformly irradiated with ultraviolet light.

In the first embodiment, the light-emitting device 102 irradiates the fluid held on the upper surface 106 with ultraviolet light so that the following condition is satisfied: when the upper surface 106 in the channel 110 is divided into regions each having a size of 0.15 m×0.15 m, the ratio of the minimum value to the maximum value of the amount of ultraviolet light per square centimeters in each of the regions is 0.8 or greater and 1.0 or less, and the ratio of the minimum value to the maximum value of the averages of the amounts of ultraviolet light in all the regions of the channel 110 is 0.8 or greater and 1.0 or less. In other words, in each of the regions, the following formula is satisfied: $0.8 \leq RMIN/RMAX \leq 1.0$, where RMIN denotes the minimum value of the amount of ultraviolet light per square centimeters in each of the regions, and RMAX denotes the maximum value of the amount of ultraviolet light per square centimeters in each of the regions. In addition, when the average of the amount of ultraviolet light is calculated in each of the regions, the following formula is satisfied: $0.8 \leq AMIN/AMAX \leq 1.0$, where AMIN denotes the minimum value of the averages in all the regions, and AMAX denotes the maximum value of the averages in all the regions. Under this condition, the fluid is substantially uniformly irradiated with ultraviolet light. Thus, the structure of the light-emitting device 102 is not limited to those illustrated in FIGS. 3 and 4. As long as the aforementioned condition is satisfied, the light-emitting elements 201 may be arranged in any appropriate pattern.

Figure 5:
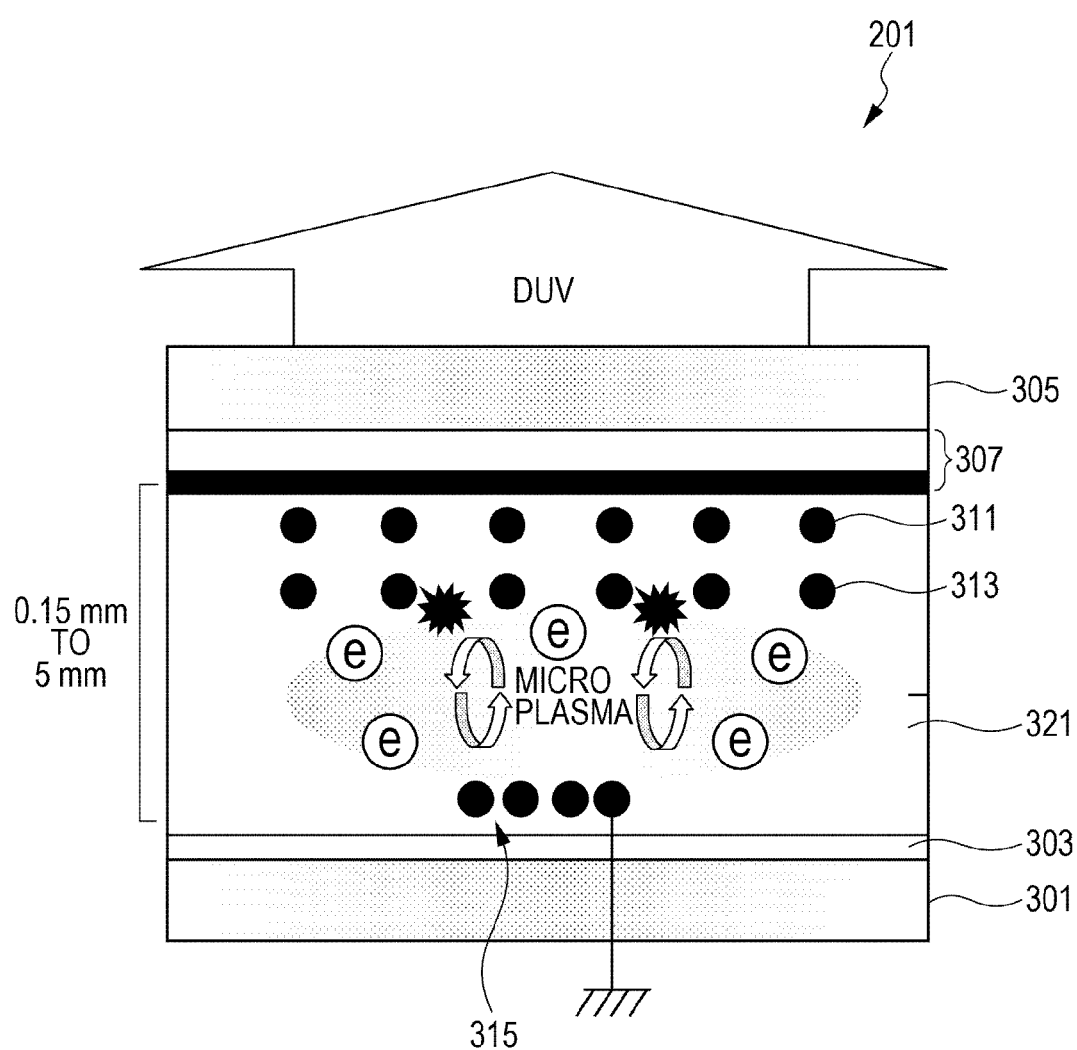
FIG. 5 illustrates an example of the structure of a light-emitting element utilizing micro-plasma.

Referring to FIG. 5, the light-emitting element 201 will be described in detail.

For example, a deep ultraviolet light-emitting element invented by the present inventor can be used as the light-emitting element 201. A deep ultraviolet light-emitting element utilizing micro-plasma is described in detail in Applied Physics Letters vol. 102 p 041114 2013, Japanese Unexamined Patent Application Publication No. 2011-124000, and the like. The contents of these documents are incorporated by reference in the present specification.

FIG. 5 illustrates an example of the structure of the light-emitting element 201 utilizing micro-plasma. As illustrated in FIG. 5, the light-emitting element 201 according to the first embodiment includes a first substrate 301, a protective film 303 disposed on the first substrate 301, ground electrodes 315 disposed above the protective film 303, a second substrate 305 facing the first substrate 301, and a multiple quantum well 307 disposed on a surface of the second substrate 305 facing the first substrate 301.

Typically, sapphire substrates are used as the first substrate 301 and the second substrate 305. For example, the protective film 303 is made of magnesium oxide (MgO), and the thickness of the protective film 303 is about 1 μm. For example, the multiple quantum well 307 is made of AlGaN.

A space 321 is formed between the first substrate 301 and the second substrate 305. For example, the thickness of the space 321 is 0.15 mm or greater and 5.0 mm or less. At least one acceleration electrode 311, which applies an acceleration voltage to electrons, and at least one discharge electrode 313 are arranged in a part of the space 321 near the second substrate 305. The acceleration electrode 311 is arranged nearer the second substrate 305 than the discharge electrode 313.

In order to generate micro-plasma, the space 321 is filled with a noble gas, such as Xe, Ne, He, or Kr, or a mixture of any of these gases. When pulses of several hundreds of volts are applied to the discharge electrode 313 and the acceleration electrode 311 for several tens of microseconds, accelerated electrons collide with the multiple quantum well 307, and the multiple quantum well 307 generates deep ultraviolet light. Deep ultraviolet light can be obtained through the second substrate 305, because sapphire has a high transmittance for ultraviolet light.

Referring back to FIG. 2, the front surface of the light-emitting device 102 is in contact with the lower surface 107 of the bottom portion 103. Each of the light-emitting elements 201 emits ultraviolet light in a direction substantially perpendicular to the lower surface 107. The term "substantially perpendicular" means that the angle between the normal line of the lower surface 107 and the normal line of the light-emitting surface of the surface-emission light source is 0 degrees or greater and 5 degrees or less. Ultraviolet light emitted to the lower surface 107 passes through the bottom portion 103 and reaches the fluid on the upper surface 106. Thus, the fluid in the entirety of the channel 110 is substantially uniformly irradiated with ultraviolet light.

With the ultraviolet irradiation apparatus 11 according to the first embodiment, the light-emitting elements 201 are regularly arranged in the entirety of the light-emitting device 102, and water flowing over the upper surface 106 is irradiated with ultraviolet light emitted from the light-emitting device 102 in the direction perpendicular to the upper surface 106. Thus, water flowing over the upper surface 106 can be substantially uniformly irradiated with ultraviolet light, and the water can be efficiently sterilized.

As illustrated in FIG. 1, in the first embodiment, a support column 123 for inclining the channel 110 is disposed at a position near an upstream portion of the channel 110. Thus, the fluid holder 101 is inclined, the upper surface 106 of the bottom portion 103 becomes an inclined surface, and the fluid flows along the channel 110 in a laminar flow.

For example, the inclination angle may be 15 degrees or greater and 70 degrees or less. Hereinafter, the "upper surface" in an inclined state may be referred to as an "inclined surface". The laminar flow will be described in detail below.

The upper surface 106, which is flat, has a substantially uniform width in the entirety of the channel 110 in a direction perpendicular to the direction in which the fluid flows. The width of the upper surface 106 is substantially the same as the vertical width of the light-emitting device 102, which is 1 m in the example illustrated in FIG. 3.

The water inlet 108 supplies a substantially the same amount of water along the width direction of the channel 110. It is desirable that the water inlet 108 supplies a substantially the same amount of water in the direction in which the water flows, as well. For example, at least a part of the water inlet 108 connected to the channel 110 may be made of the same material as the inclined surface 106 of the channel 110 and may have the same shape as the inclined surface 106. However, the shape of the water inlet 108 is not particularly limited, as long as the water inlet 108 can have the aforementioned function.

The water outlet 109 allows water that has been irradiated with ultraviolet light in the channel 110 to pass therethrough. The water outlet 109 is an outlet through which water that has been sterilized in the channel 110 passes. For example, the water outlet 109 is configured so that water flowing through the channel 110 in a laminar flow does not form a turbulent flow. Depending on the shape of the water outlet 109, water flowing through the channel 110 might form a turbulent flow. To suppress this, for example, at least a part of the water outlet 109 connected to the channel 110 may be made of the same material as the inclined surface 106 of the channel 110 and may have the same shape as the inclined surface 106. For example, water that has passed through the water outlet 109 is collected in a collection tank (not shown).

The Reynolds number will be described in order to help understanding laminar flow. The Reynolds number Re is a dimensionless number defined by expression 1. Here, V denotes the flow velocity (m/s), L denotes the representative length (m) of the channel 110, and ν denotes the coefficient of kinematic viscosity (m$^2$/s) of the fluid. It is known that the coefficient of kinematic viscosity of water is dependent on the atmospheric pressure and the temperature, and, for example, the coefficient of kinematic viscosity of water is $1.004 \times 10^{-6}$ m$^2$/s at 1 atmospheric pressure and a temperature of 20 degrees.

$$Re = VL/\nu \qquad \text{(expression 1)}$$

In general, a fluid forms a laminar flow when the Reynolds number Re is small, and transition from laminar flow to turbulent flow occurs as the Reynolds number Re increases. Therefore, the Reynolds number Re is used as an indicator for distinguishing between laminar flow and turbulent flow. The value of the Reynolds number Re at which transition from laminar flow to turbulent flow occurs is called a critical Reynolds number.

Regarding a rectangular channel of the first embodiment, it is known that the stability of flow of fluid greatly depends on the aspect ratio (the ratio of the width to the height) of a cross-section of the channel and, assuming that the aspect ratio is infinitely large, the critical Reynolds number is about 5772. Note that this value is only an approximation.

It is possible to cause water to flow in a laminar flow by determining the flow velocity V and the representative length L so that the Reynolds number Re becomes less than or equal to the critical Reynolds number. In determining the representative length L, the hydraulic diameter D can be regarded as the representative length L. The hydraulic diameter D can be calculated using expression 2, shown below, from the cross-sectional area A (m$^2$) and the wetted perimeter P (m) of the fluid in the channel. The wetted perimeter is the length of parts of the channel that are in contact with the fluid. As illustrated in FIG. 2, when the width of the channel 110 is a (m) and the thickness of water is d (m), the cross-sectional area is a×d (m$^2$), and the wetted perimeter is a+2d (m).

$$D = 4A/P \qquad \text{(expression 2)}$$

Thus, by using expressions 1 and 2, it is possible to determine various parameters, such as the flow velocity, the width of the channel 110, and the thickness of water. For example, the flow velocity V can be determined by adjusting the inclination angle of the channel 110. In order to adjust the inclination angle, the ultraviolet irradiation apparatus 11 may further include a mechanism for adjusting the inclination angle of the fluid holder 101. For example, this can be realized by providing the support column 123 (e.g. a telescopic column or a pantograph) with a mechanism for extending and contracting the support column 123 (e.g. an electric motor or a jack mechanism).

In a case where the inclination angle of the channel 110 is determined beforehand when designing the apparatus, the thickness d of water in the channel 110 may be determined on the basis of the flow velocity V at the predetermined inclination angle.

In the first embodiment, the upper surface of the fluid is not in contact the channel 110. However, if the upper surface of the fluid were in contact with the channel 110, the hydraulic diameter D would decrease, and, as a result, Reynolds number would decrease. Therefore, a structure may be used in which the upper surface of the fluid is in contact the channel 110.

Figure 6:
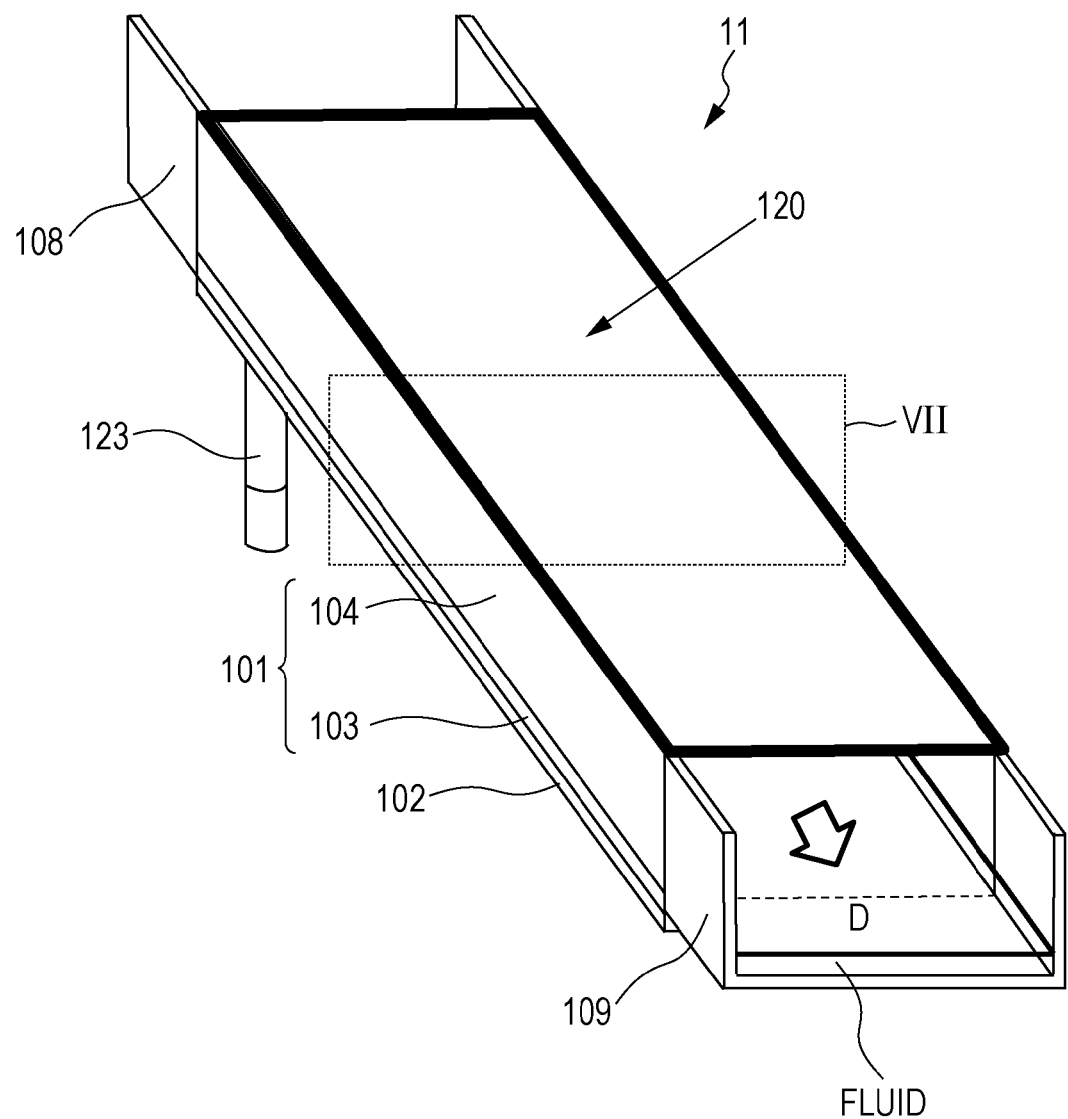
FIG. 6 is an external view of an ultraviolet irradiation apparatus including a reflector plate.
Figure 7:
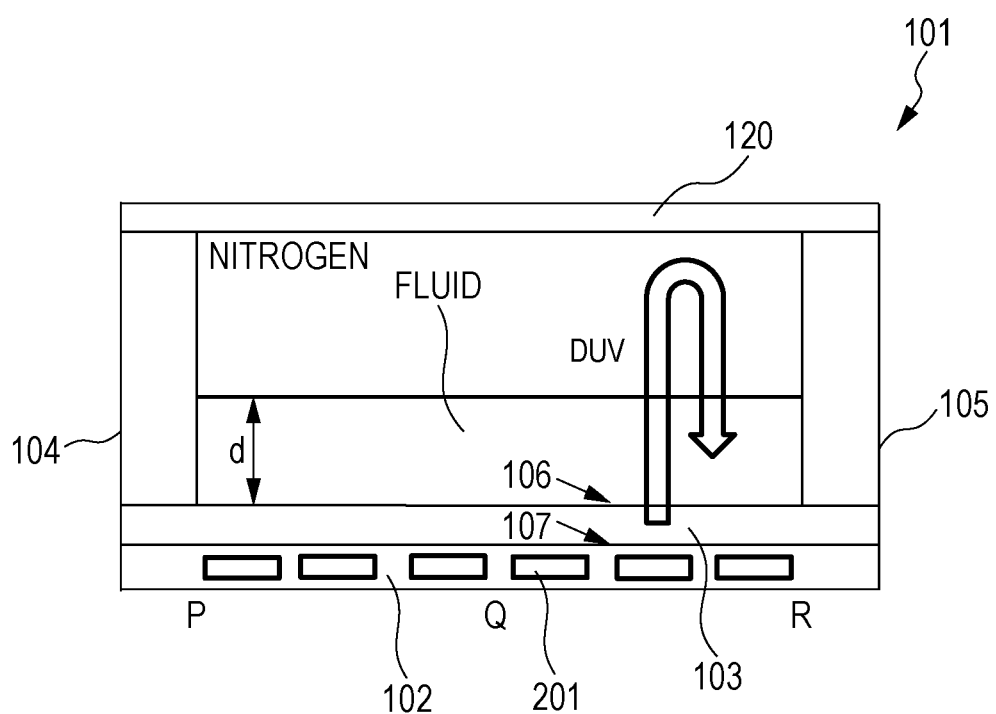
FIG. 7 is a sectional view of a fluid holder including a reflector plate, taken along a plane VII in FIG. 6 perpendicular to a bottom portion.

Another structure that can more efficiently utilize ultraviolet light will be described. FIG. 6 is an external view of an ultraviolet irradiation apparatus 11 including a reflector plate 120. FIG. 7 is a sectional view of a fluid holder 101 including a reflector plate 120, taken along a plane VII in FIG. 6 perpendicular to a bottom portion 103. As illustrated in FIGS. 6 and 7, for the purpose of efficiently utilizing ultraviolet light, the reflector plate 120 may face the inclined surface 106 so as to reflect ultraviolet light that has passed through a fluid on the inclined surface 106 toward the fluid. The reflector plate 120 reflects ultraviolet light that has passed through the inclined surface 106 toward the water on the inclined surface 106 so that the water is irradiated again with ultraviolet light substantially perpendicularly to the water. For example, the reflector plate 120 is made of aluminum.

Depending on its wavelength, ultraviolet light may become attenuated in air. The light-emitting device 102 emits ultraviolet light in a wavelength range of 180 nm to 350 nm. In particular, ultraviolet light having a wavelength of 180 nm, which is short, becomes attenuated in air. This is because ultraviolet light having a short wavelength is absorbed by oxygen in air. As illustrated in FIG. 7, to suppress absorption, the channel 110 is filled with, for example, nitrogen, and a part of the fluid is in contact with nitrogen. Thus, absorption of ultraviolet light in air is suppressed, and reflected ultraviolet light can be efficiently used. Note that, as described above, it is not necessary that a part of the fluid be in contact with a gas. Instead, a surface of the reflector plate 120 may be in direct contact with the fluid.

With the ultraviolet irradiation apparatus 11 according to the first embodiment, in a design phase, the inclination angle of the inclined surface 106 and the width of the channel 110 can be appropriately determined as long as the Reynolds number does not exceed the critical Reynolds number. Moreover, the length of the channel 110 can be appropriately determined with consideration of a time for which a fluid is to be irradiated with ultraviolet light. For example, the greater the length of the channel 110, the longer the time for which the fluid is irradiated with ultraviolet light, and the greater the amount of fluid in which bacteria can be killed (the sterilization throughput). The smaller the angle of the inclined surface 106, the lower the flow velocity, the longer the time for which the fluid is irradiated with ultraviolet light, and the greater the sterilization throughput. The greater the width of the channel 110, the greater the sterilization throughput of water. Thus, it is possible to design the ultraviolet irradiation apparatus with consideration of the sterilization throughput in a design phase.

Furthermore, it is possible to adjust the sterilization throughput not only in a design phase but also during use of the ultraviolet irradiation apparatus 11. The sterilization throughput can be controlled by, for example, adjusting the amount of water (the thickness of water) or by adjusting the amount of ultraviolet light emitted by the light-emitting device 102. The sterilization throughput can be increased by reducing the amount of water and/or increasing the amount of ultraviolet light emitted by the light-emitting device 102. The sterilization throughput can be reduced by increasing the amount of water and/or reducing the amount of ultraviolet light emitted by the light-emitting device 102.

As described above, the ultraviolet irradiation apparatus 11 according to the first embodiment functions as a water sterilizing apparatus. With the first embodiment, it is possible to efficiently sterilize water in accordance with the level of contamination of the water by increasing or decreasing the sterilization throughput.

Second Embodiment

Figure 8:
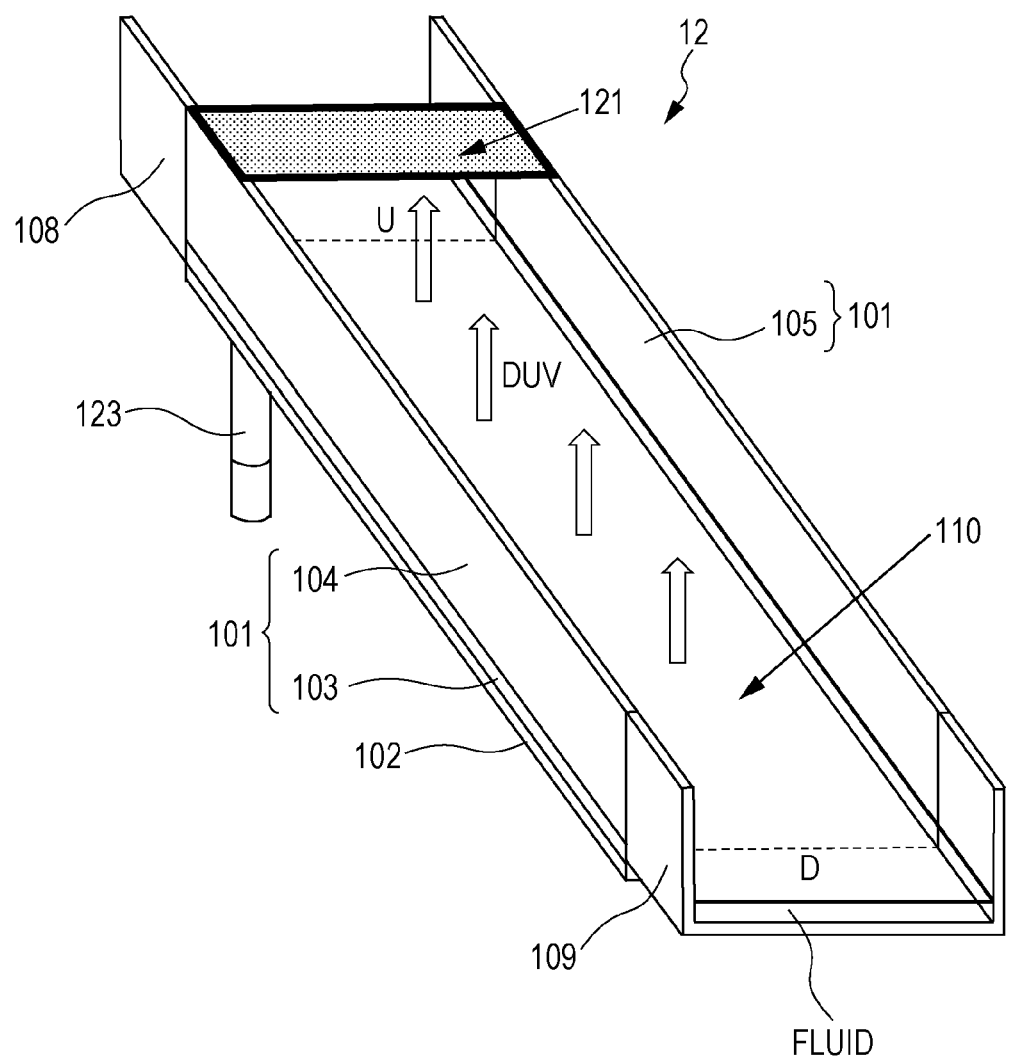
FIG. 8 is an external view of an ultraviolet irradiation apparatus including an upstream sensor, according to a second exemplary embodiment.

Referring to FIG. 8, a second embodiment will be described.

FIG. 8 is an external view of an ultraviolet irradiation apparatus 12 including an upstream sensor 121. In the ultraviolet irradiation apparatus 12 according to the second embodiment, the upstream sensor 121 is disposed in an upstream portion of the channel 110. Excluding the upstream sensor 121, the structure of the ultraviolet irradiation apparatus 12 is the same as that of the ultraviolet irradiation apparatus 11 according to the first embodiment, and therefore detailed description thereof will be omitted. In FIG. 8, elements of the ultraviolet irradiation apparatus 12 that are the same as those of the ultraviolet irradiation apparatus 11 according to the first embodiment are denoted by the same numerals.

The upstream sensor 121 detects the amount of deep ultraviolet light that has passed through untreated water. For example, the upstream sensor 121 may be a semiconductor ultraviolet light sensor, a quantum sensor, or a thermal sensor. When water contains microorganisms (for example, bacteria), deep ultraviolet light is absorbed by the microorganisms. When water contains particles, deep ultraviolet light is scattered by the particles. Therefore, when water contains microorganisms or particles, the amount of deep ultraviolet light that passes through the water decreases. Accordingly, by detecting the amount of deep ultraviolet light that passes through water using the upstream sensor 121, it is possible to detect the level of contamination of water before being sterilized by ultraviolet irradiation.

The upstream sensor 121 may detect emission of light from microorganisms. When microorganisms are irradiated with ultraviolet light, which serves as excitation light, proteins and amino acids of the microorganisms become excited. As a result, emission of light occurs. If microorganisms exhibit fluorescence, the upstream sensor 121 may detect the fluorescent light. Thus, the amount of microorganisms in water can be detected. The emission spectrum differs between living microorganisms and dead microorganisms. By using this characteristic, the amount of living microorganisms in water may be measured by irradiating microorganisms with ultraviolet light and by detecting light emitted from the microorganisms using the upstream sensor 121.

A light source used for detection performed by the upstream sensor 121 may differ from a light source (the light-emitting element 201) for emitting ultraviolet light for sterilization. For example, the light-emitting element 201 may be used as an excitation light source, a fluorescent member may be used to convert ultraviolet light into visible light or near-infrared light, microorganisms may be irradiated with the converted light, and the upstream sensor 121 may detect emission of light from the microorganisms. Alternatively, the upstream sensor 121 may detect the amount of visible light or near-infrared light that has passed through untreated water. Thus, it is possible to detect the amount of visible light or near-infrared light absorbed by microorganisms.

With the ultraviolet irradiation apparatus 12 according to the second embodiment, it is possible to detect the level of contamination of water by using the upstream sensor 121 and to adjust the sterilization throughput in accordance with the level of contamination of water. When the level of contamination of water is high, the sterilization throughput is increased. For example, the sterilization throughput can be increased by reducing the amount of water, by increasing the power of the light-emitting device, or by increasing the time for which the water is irradiated with ultraviolet light. In contrast, when the level of contamination of water is low, the sterilization throughput is reduced. For example, the sterilization throughput can be reduced by increasing the amount of water, by reducing the power of the light-emitting device, or by reducing the time for which the water is irradiated with ultraviolet light.

Thus, it is possible to efficiently sterilize water by appropriately controlling the sterilization throughput in accordance with the level of contamination of water before being sterilized. Moreover, it possible to control the power of the light-emitting device and to reduce the power consumption of the apparatus.

Third Embodiment

Figure 9:
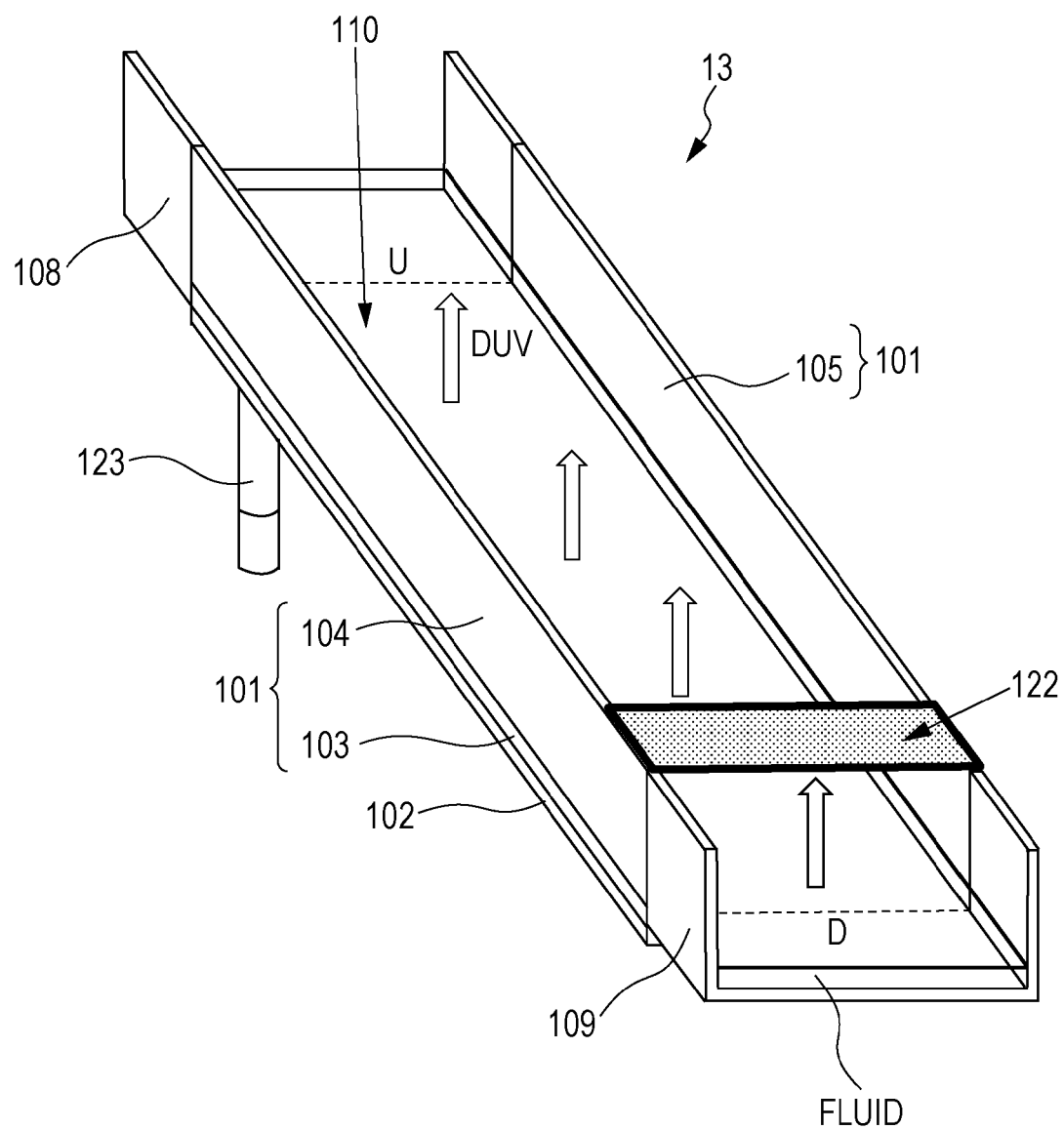
FIG. 9 is an external view of an ultraviolet irradiation apparatus including a downstream sensor, according to a third exemplary embodiment.

Referring to FIG. 9, a third embodiment will be described.

FIG. 9 is an external view of an ultraviolet irradiation apparatus 13 including a downstream sensor 122. In the ultraviolet irradiation apparatus 13 according to the third embodiment, the downstream sensor 122 is disposed in a downstream portion of the channel 110. Excluding the downstream sensor 122, the structure of the ultraviolet irradiation apparatus 13 is the same as that of the ultraviolet irradiation apparatus 11 according to the first embodiment, and therefore detailed description thereof will be omitted. In FIG. 9, elements of the ultraviolet irradiation apparatus 13 that are the same as those of the ultraviolet irradiation apparatus 11 according to the first embodiment are denoted by the same numerals.

The downstream sensor 122 detects the amount of deep ultraviolet light that has passed through treated water. As with the upstream sensor 121, the downstream sensor 122 may be, for example, a semiconductor ultraviolet light sensor, a quantum sensor, or a thermal sensor. The upstream sensor 121 and the downstream sensor 122 may be the same sensor.

The downstream sensor 122 can detect the level of contamination of water in the same way as the upstream sensor 121 does. Therefore, it is possible to suppress insufficient sterilization or excessive sterilization by monitoring a change in the amount of ultraviolet light after sterilization detected by the downstream sensor 122. If sterilization is insufficient, the sterilization throughput may be increased. The sterilization throughput can be increased in the same way as in the first or second embodiment. If the sterilization throughput is excessive, for example, the sterilization throughput, that is, the amount of emission of deep ultraviolet light, may be gradually decreased.

Thus, it is possible to efficiently sterilize water by appropriately controlling the sterilization throughput in accordance with the level of contamination of water after having been sterilized. Moreover, it possible to control the power of the light-emitting device in real time and to reduce the power consumption of the apparatus.

Fourth Embodiment

Figure 10:
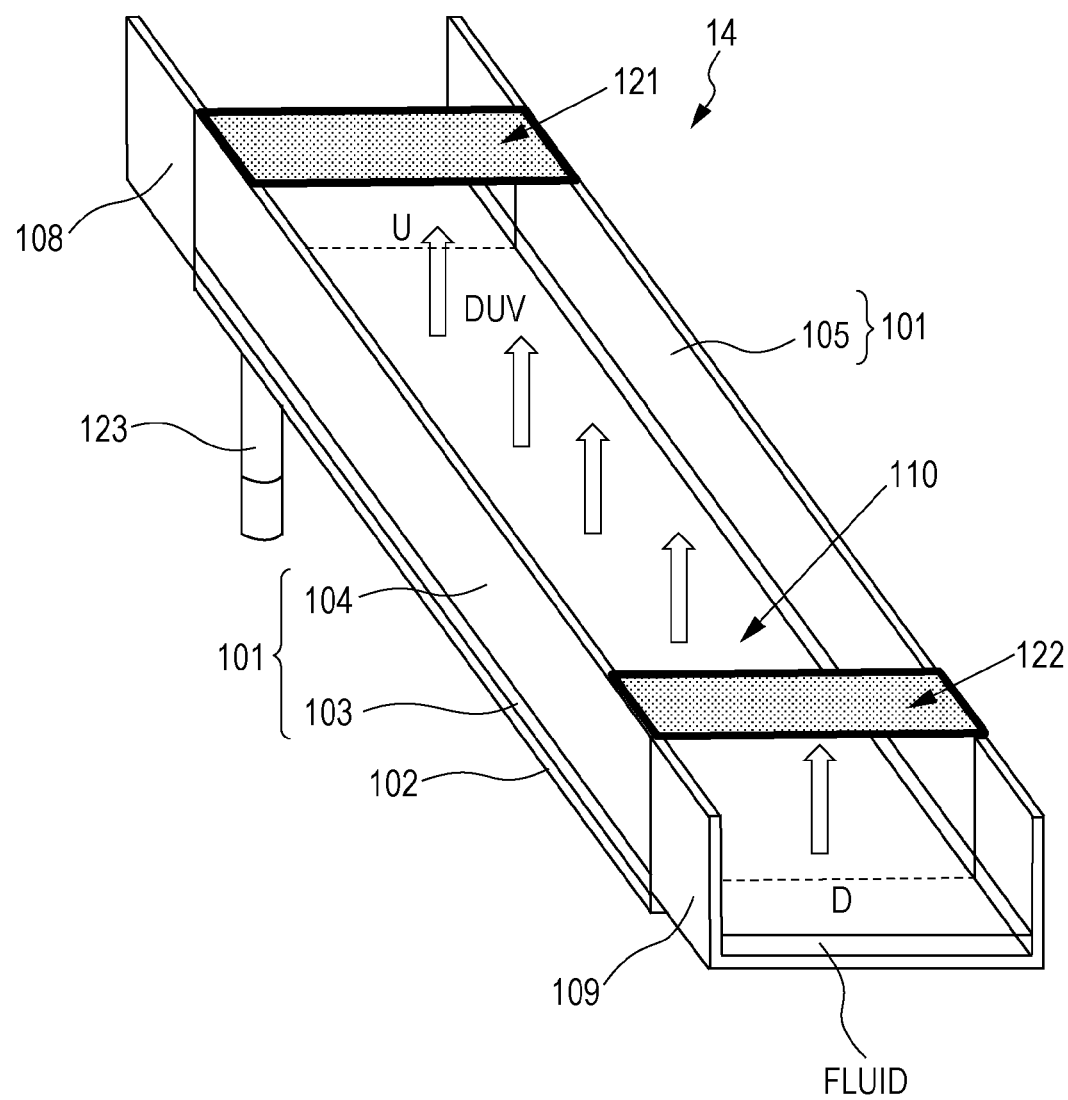
FIG. 10 is an external view of an ultraviolet irradiation apparatus, including an upstream sensor and a downstream sensor, according to a fourth exemplary embodiment.

Referring to FIG. 10, a fourth embodiment will be described.

FIG. 10 is an external view of an ultraviolet irradiation apparatus 14 including an upstream sensor 121 and a downstream sensor 122. As illustrated in FIG. 10, the upstream sensor 121 is disposed in an upstream portion of the channel 110, and the downstream sensor 122 is disposed in a downstream portion of the channel 110. The ultraviolet irradiation apparatus 14 according to the fourth embodiment may be called a hybrid of the ultraviolet irradiation apparatuses according to the second and third embodiments. Excluding the upstream sensor 121 and the downstream sensor 122, the structure of the ultraviolet irradiation apparatus 14 is the same as that of the ultraviolet irradiation apparatus 11 according to the first embodiment, and therefore detailed description thereof will be omitted. In FIG. 10, elements of the ultraviolet irradiation apparatus 14 that are the same as those of the ultraviolet irradiation apparatus 11 according to the first embodiment are denoted by the same numerals.

Figure 11:
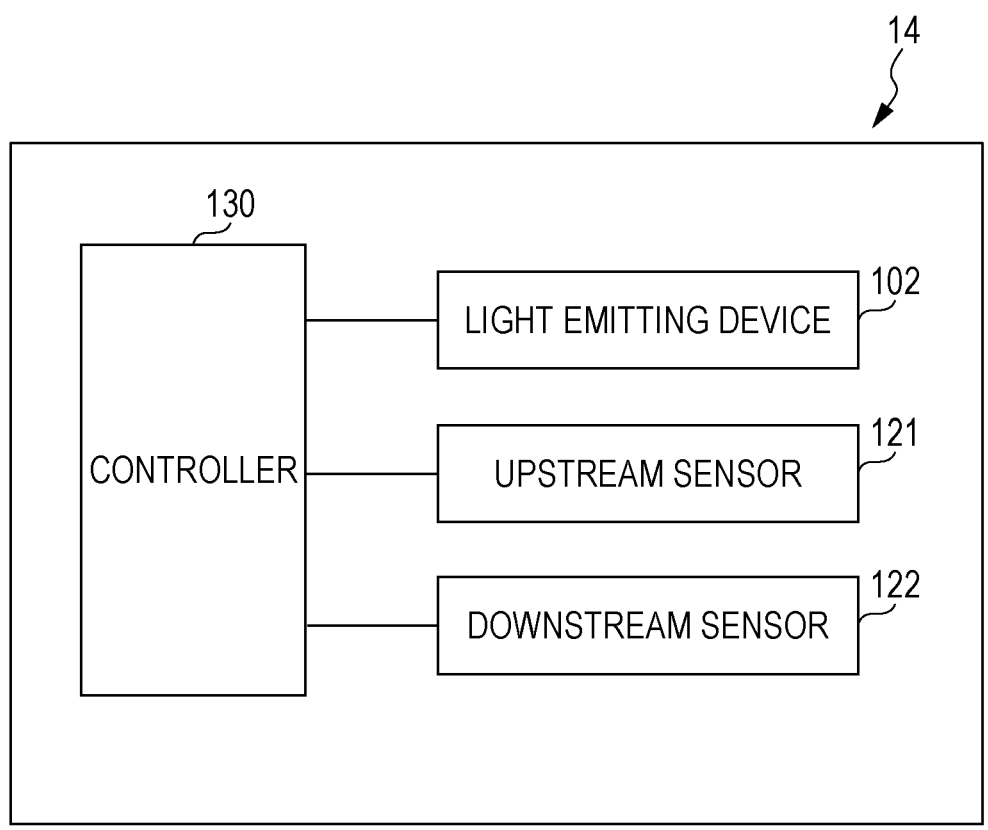
FIG. 11 is a block diagram of the ultraviolet irradiation apparatus according to the fourth exemplary embodiment.

Referring to FIG. 11, a block diagram of the ultraviolet irradiation apparatus 14 according to the fourth embodiment will be described.

FIG. 11 is the block diagram of the ultraviolet irradiation apparatus 14 according to the fourth exemplary embodiment. The ultraviolet irradiation apparatus 14 includes a controller 130. The controller 130 controls the entirety of the apparatus. For example, the controller 130 includes a ROM that stores a program and a CPU that executes the program. For example, the ROM stores a program for controlling the operation of the entirety of the apparatus.

Note that each of the ultraviolet irradiation apparatuses according to the first to third embodiments also includes the controller 130, and the controller 130 controls the entirety of the apparatus including the light-emitting device 102.

Data is sent and received between the controller 130 and each of the light-emitting device 102, the upstream sensor 121, and the downstream sensor 122, which are electrically connected to the controller 130. The upstream sensor 121 and the downstream sensor 122 detect deep ultraviolet light that has passed through water and send information representing the amount of detected ultraviolet light to the controller 130. On the basis of information representing the amount of ultraviolet light detected by the upstream sensor 121 and the downstream sensor 122, the controller 130 determines an appropriate sterilization throughput and controls the light-emitting device 102 so that the amount of ultraviolet light becomes an appropriate irradiation amount. To be specific, in accordance with the amount of ultraviolet light detected by each of the upstream sensor 121 and the downstream sensor 122, the controller 130 controls the amount of ultraviolet light with which the fluid is to be irradiated and a time for which the fluid is to be irradiated with ultraviolet light.

A specific example of control performed by the controller 130 will be described. On the basis of the amount of deep ultraviolet light detected by the upstream sensor 121, the controller 130 determines the amount of ultraviolet light to be emitted by the light-emitting device 102 per unit time. In accordance with the determined amount of ultraviolet light per unit time, the light-emitting device 102 emits ultraviolet light.

The controller 130 monitors the amount of deep ultraviolet light detected by the downstream sensor 122. In accordance with a change in the amount of deep ultraviolet light, the controller 130 determines whether or not the sterilization throughput is excessive. If the controller 130 determines that the sterilization throughput is excessive, the controller 130 controls the light-emitting device 102 so as to reduce the amount of ultraviolet light emitted from the light-emitting device 102. If the controller 130 determines that the sterilization throughput is insufficient, the controller 130 controls the light-emitting device 102 so as to increase the amount of ultraviolet light emitted from the light-emitting device 102. For example, the controller 130 calculates the ratio of the amount of the detected deep ultraviolet light to the amount of the emitted ultraviolet light. Then, the controller 130 determines that the sterilization throughput is excessive when the ratio is higher than a first predetermined value, and determines that the sterilization throughput is insufficient when the ratio is lower than a second predetermined value.

With the ultraviolet irradiation apparatus 14 according to the fourth embodiment, it is possible to optimize the sterilization throughput in the entirety of the apparatus on the basis of the amount of deep ultraviolet light detected by the upstream sensor 121 and the amount of deep ultraviolet light detected by the downstream sensor 122. Thus, it is possible to efficiently sterilize water.

Other Embodiments

Referring to figures as necessary, other embodiments will be described.

In the first to fourth embodiments, water is used as an example of a fluid. However, it is not necessary that the fluid be a liquid. Instead, a gas can be treated by using an ultraviolet irradiation apparatus according to any one of first to fourth embodiments. For example, the ultraviolet irradiation apparatus can be used to sterilize air in a hospital or a clean room.

In each of examples described in the first to fourth embodiments, a fluid flows along the fluid holder 101 is irradiated with ultraviolet light from a lower surface of the fluid. Alternatively, a fluid may be irradiated with ultraviolet light from an upper surface of the fluid.

Figure 12:
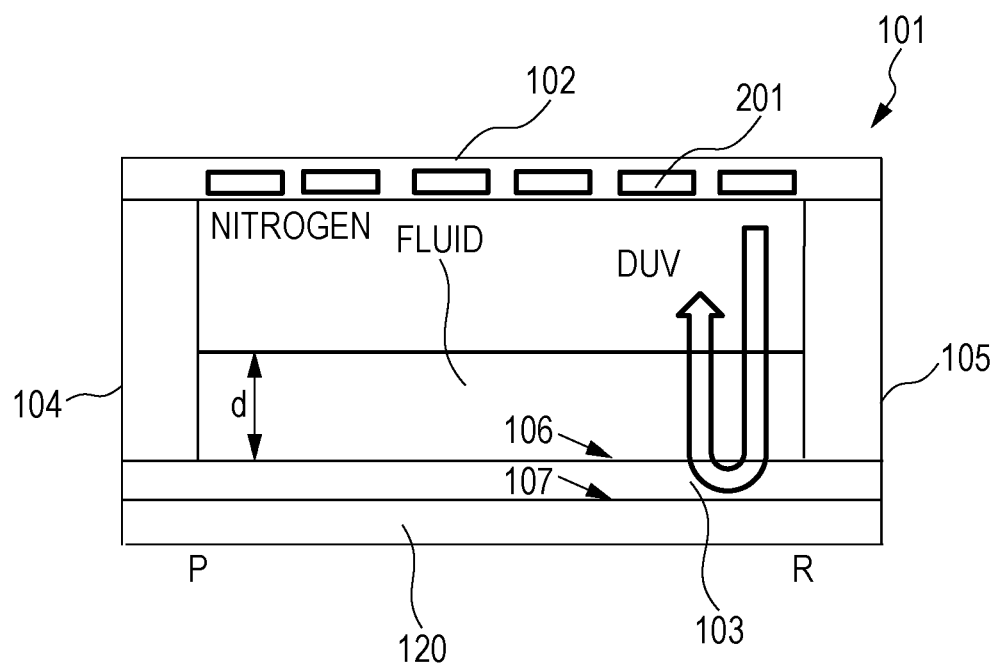
FIG. 12 is a sectional view of a fluid holder taken along a plane perpendicular to a bottom portion, illustrating an example of the structure of an ultraviolet irradiation apparatus that irradiates a fluid with ultraviolet light from an upper surface of the fluid.

FIG. 12 is a sectional view of a fluid holder 101 taken along a plane perpendicular to a bottom portion 103, illustrating an example of the structure of an ultraviolet irradiation apparatus that irradiates a fluid with ultraviolet light from an upper surface of the fluid. A light-emitting device 102, which faces an upper surface 106, is disposed above the fluid holder 101. The light-emitting device 102 substantially uniformly irradiates a fluid on the upper surface 106 with ultraviolet light. As described above, the fluid holder 101 is filled with nitrogen in order to reduce absorption of ultraviolet light by air. A reflector plate 120 is disposed below the bottom portion 103. Thus, the fluid is irradiated with ultraviolet light from the upper surface of the fluid, the reflector plate 120 reflects the ultraviolet light that has passed through the fluid, and the fluid can be irradiated with the reflected ultraviolet light again. Note that the reflector plate 120 may be omitted.

The light-emitting device 102 may emit ultraviolet light having different wavelengths in accordance with the positions of parts of the fluid held on the upper surface 106 to be irradiated with the ultraviolet light. For example, a part of the fluid in an upstream portion and a part of the fluid in a downstream portion of the channel may be irradiated with ultraviolet light having different wavelengths. In this case, it is possible to efficiently sterilize water containing microorganisms of different types with a single operation by using ultraviolet light having different wavelengths instead of ultraviolet light having a single wavelength.

In the fourth embodiment, the upstream sensor 121 and the downstream sensor 122 are respectively provided in an upstream portion and a downstream portion of the channel 110. In addition, a middle sensor (not shown) may be provided in a middle-stream portion of the channel 110. The middle sensor detects the amount of ultraviolet light that has passed through water that has been treated in the upstream portion. As with the upstream sensor 121 and the downstream sensor 122, the middle sensor may be, for example, a semiconductor ultraviolet light sensor, a quantum sensor, or a thermal sensor. If it is detected in the midstream portion that water has been sterilized, it is not necessary to sterilize water in the downstream portion by irradiating the water with ultraviolet light. In such a case, emission of ultraviolet light may be stopped in the downstream portion. As a result, it is possible to reduce the power consumption of the apparatus.

Figure 13:
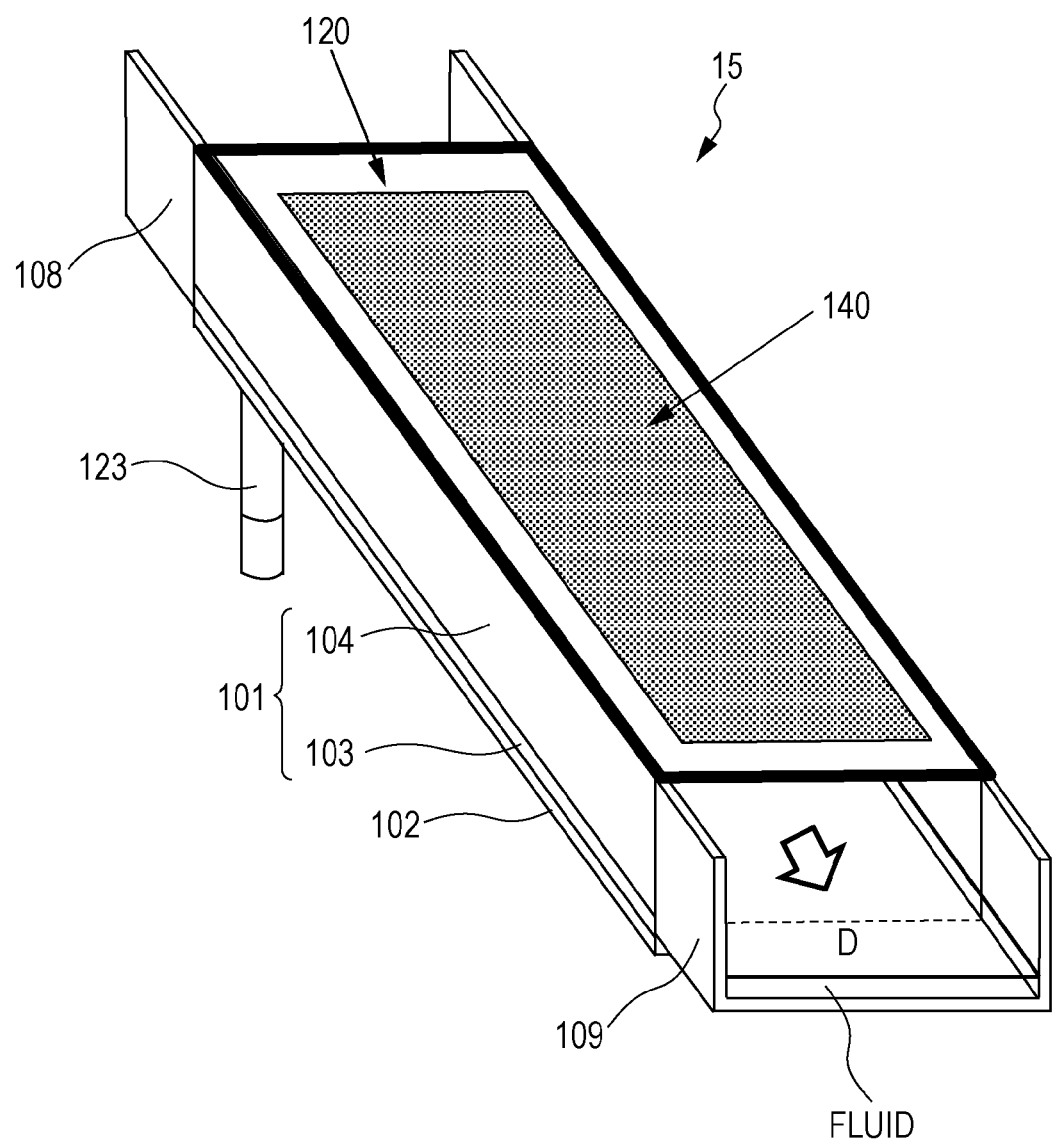
FIG. 13 is an external view of an ultraviolet irradiation apparatus including a solar panel.

FIG. 13 is an external view of an ultraviolet irradiation apparatus 15 including a solar panel 140. As illustrated in FIG. 13, the solar panel 140 is disposed on the reflector plate 120 described in the first embodiment. The solar panel 140 includes a plurality of solar cells and generates electric power from optical energy from the Sun. Generated electric power is supplied to the entirety of the ultraviolet irradiation apparatus and drives the entirety of the apparatus.

In order to efficiently utilize ultraviolet light, the ultraviolet irradiation apparatus 15 includes the reflector plate 120. Alternatively, the reflector plate 120 may be omitted, and the solar panel 140 may be disposed directly on the fluid holder 101.

With this structure, it is not necessary to prepare an external power supply, so that the ultraviolet irradiation apparatus can be used more conveniently. By reducing the size of the ultraviolet irradiation apparatus, it can be used as a water sterilizing apparatus that can be used in homes in an emergency.

Moreover, it is possible to construct a hybrid ultraviolet irradiation apparatus (not shown) by using a combination of a megawatt-capacity solar power plant and the ultraviolet irradiation apparatus. It is possible to efficiently utilize a space in a megawatt-capacity solar power plant in which solar panels are not disposed. For example, a low-profile channel, through which water flows, may be formed below a solar panel, and a light-emitting device may be disposed below the channel or on the back side of the solar panel.

In the examples described in the first to fourth embodiments, water is sterilized in a continuous operation. However, an aspect of the present disclosure can be used as an apparatus that sterilizes water in a batch operation.

Figure 14A:
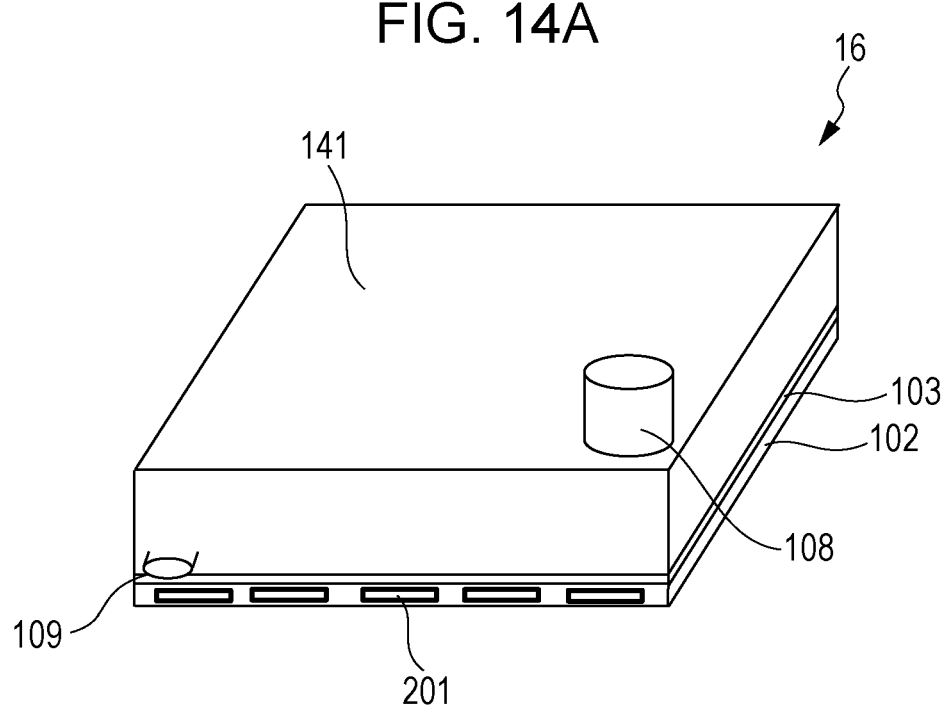
FIG. 14A is an external view of an ultraviolet irradiation apparatus that sterilizes water in a batch operation.
Figure 14B:
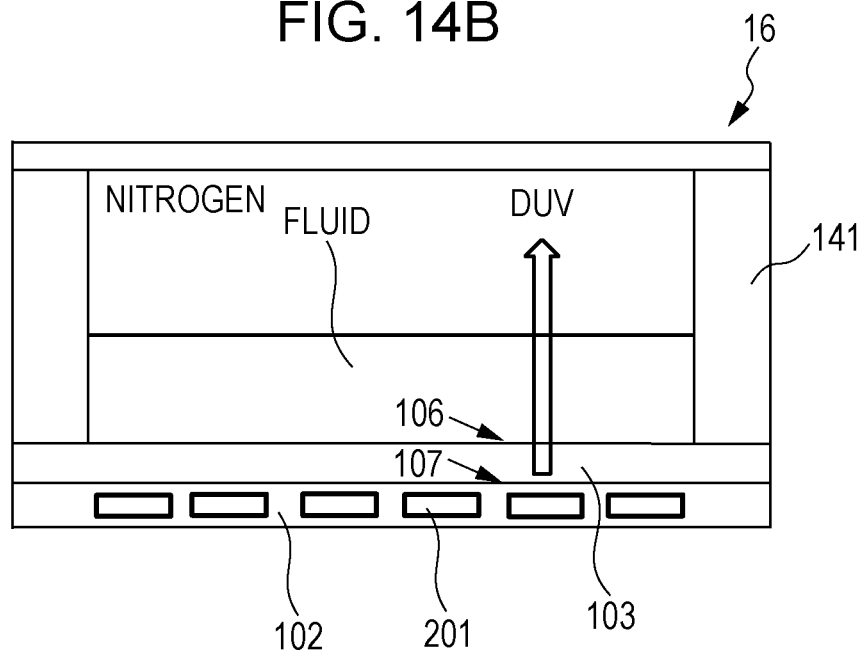
FIG. 14B is a sectional view of the ultraviolet irradiation apparatus taken along a plane perpendicular to a bottom portion.

FIG. 14A is an external view of an ultraviolet irradiation apparatus 16 that sterilizes water in a batch operation. FIG. 14B is a sectional view of the ultraviolet irradiation apparatus 16 taken along a plane perpendicular to a bottom portion 103. The ultraviolet irradiation apparatus 16 includes a light-emitting device 102, a bottom portion 103, a water inlet 108, a water outlet 109, and a tank 141 for storing water. In the ultraviolet irradiation apparatus 16, the upper surface 106 of the bottom portion 103 is substantially horizontal. The term "substantially horizontal" means that the angle between the normal line of the upper surface 106 and the vertical direction is 0 degrees or greater and 5 degrees or less.

Water to be treated is poured through the water inlet 108 and stored in the tank 141. The light-emitting device 102 irradiates water in the tank 141 with ultraviolet light for a certain time to sterilize the water. The sterilized water is taken out through the water outlet 109. With the ultraviolet irradiation apparatus 16 according to an aspect of the present disclosure, it is possible to substantially uniformly irradiate water in the tank 141 with ultraviolet light without stirring water, even though the ultraviolet irradiation apparatus 16 performs a batch operation.

In order to efficiently utilize ultraviolet light, a reflector plate may be disposed on an upper surface of the tank 141. In this case, the tank 141 is filled with nitrogen to suppress absorption of ultraviolet light by air.

For example, the ultraviolet irradiation apparatus according to an aspect of the present disclosure can be used to sterilize a large amount of water, such as, to treat water in a swimming pool or a water purification plant. By reducing the size of the ultraviolet irradiation apparatus, the ultraviolet irradiation apparatus can be used as a water sterilizing apparatus that can be used in homes in an emergency.

Heretofore, the present disclosure has been described by using exemplary embodiments. However, it would be clear for a person having ordinary skill in the art that the present disclosure can be modified in various ways and many other embodiments different from those described above can be conceived. Therefore, it is intended that the claims cover all modifications within the spirit and scope of the disclosure.

What is claimed is:

1. An ultraviolet irradiation apparatus comprising:
   a fluid holder including a bottom portion having an upper surface and a lower surface, the bottom portion holding a fluid on the upper surface with a substantially uniform thickness, the bottom portion made of a material that transmits ultraviolet light; and
   a light-emitting device adjacent the lower surface that substantially uniformly irradiates the fluid held on the upper surface with ultraviolet light from the lower surface through the bottom portion.

2. The ultraviolet irradiation apparatus according to claim 1, wherein the fluid is a liquid.

3. The ultraviolet irradiation apparatus according to claim 2, wherein the liquid is water.

4. The ultraviolet irradiation apparatus according to claim 3, wherein the ultraviolet irradiation apparatus sterilizes the water by irradiating the water with the ultraviolet light.

5. The ultraviolet irradiation apparatus according to claim 2, wherein the upper surface is a flat surface.

6. The ultraviolet irradiation apparatus according to claim 2, wherein, in the fluid holder, a part of the liquid is in contact with a gas.

7. The ultraviolet irradiation apparatus according to claim 6, wherein the gas is nitrogen.

8. The ultraviolet irradiation apparatus according to claim 1, wherein the upper surface is an inclined surface and the fluid held on the upper surface flows steadily along the inclined surface.

9. The ultraviolet irradiation apparatus according to claim 1, wherein the fluid held on the upper surface flows in a laminar flow.

10. The ultraviolet irradiation apparatus according to claim 9, wherein the fluid holder has a representative length L which satisfies VL/ν≤CRE, where CRE denotes a critical Reynolds number, ν denotes a coefficient of kinematic viscosity of the fluid, and V denotes a flow velocity of the fluid.

11. The ultraviolet irradiation apparatus according to claim 1, wherein the ultraviolet light has a peak wavelength that is 180 nm or greater and 350 nm or less.

12. The ultraviolet irradiation apparatus according to claim 1, wherein the ultraviolet light is emitted substantially perpendicularly to the upper surface.

13. The ultraviolet irradiation apparatus according to claim 1, wherein the bottom portion of the fluid holder is made of a silica glass.

14. The ultraviolet irradiation apparatus according to claim 1, further comprising a reflector plate that faces the upper surface, the reflector plate reflecting at least a part of the ultraviolet light that has passed through the fluid held on the upper surface toward the fluid.

15. The ultraviolet irradiation apparatus according to claim 1, further comprising a sensor that faces the upper surface, the sensor detecting an amount of at least a part of the ultraviolet light that has passed through the fluid held on the upper surface.

16. The ultraviolet irradiation apparatus according to claim 15, further comprising a controller that controls an amount per unit time of the ultraviolet light to irradiate the fluid in accordance with an amount of the ultraviolet light detected by the sensor.

17. The ultraviolet irradiation apparatus according to claim 15, further comprising a controller that controls a time for which the fluid is irradiated with the ultraviolet light in accordance with an amount of the ultraviolet light detected by the sensor.

18. The ultraviolet irradiation apparatus according to claim 1, wherein the ultraviolet light is micro-plasma excitation light.

19. The ultraviolet irradiation apparatus according to claim 1, wherein the upper surface is substantially horizontal, the fluid holder stores the fluid for a certain time, and, in the certain time, the light-emitting device irradiates the fluid with the ultraviolet light for a predetermined time.

20. The ultraviolet irradiation apparatus according to claim 1, wherein the light-emitting device irradiates different parts of the fluid held on the upper surface with ultraviolet light having different wavelengths in accordance with positions of the parts of the fluid.

21. An ultraviolet irradiation method comprising:
holding a fluid with a substantially uniform thickness on an upper surface of a bottom portion of a fluid holder, wherein the bottom portion is made of a material that transmits ultraviolet light; and
substantially uniformly irradiating the fluid held on the upper surface with ultraviolet light through the bottom portion using a light-emitting device adjacent a lower surface of the bottom portion.

* * * * *